United States Patent
Kendall

(10) Patent No.: US 6,568,897 B2
(45) Date of Patent: *May 27, 2003

(54) RAISABLE/LOWERABLE VEHICLE BED CARRYING LOADS

(75) Inventor: Jeffrey Kendall, Ararat (AU)

(73) Assignee: Razorback Vehicles Corporation Pty. Ltd., Edgecliff (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 220 days.

(21) Appl. No.: 09/486,883

(22) PCT Filed: Sep. 16, 1998

(86) PCT No.: PCT/AU98/00766
§ 371 (c)(1),
(2), (4) Date: Mar. 13, 2000

(87) PCT Pub. No.: WO99/14076
PCT Pub. Date: Mar. 25, 1999

(65) Prior Publication Data
US 2001/0043851 A1 Nov. 22, 2001

(30) Foreign Application Priority Data
Sep. 16, 1997 (AU) ............................................. PO 9245

(51) Int. Cl.[7] .................................................. B60P 1/02

(52) U.S. Cl. ........................ 414/495; 414/460; 414/537; 254/2 R; 187/274

(58) Field of Search ................................. 414/476, 471, 414/495, 460, 461, 537; 187/207, 208, 206, 203, 274; 254/2 R, 93 R

(56) References Cited

U.S. PATENT DOCUMENTS 4,171,927 A  * 10/1979  Aoyama ..................... 414/460
5,630,693 A     5/1997  Sobina
5,951,233 A  *  9/1999  Boucher et al. ........ 414/537 X

FOREIGN PATENT DOCUMENTS

| GB | 2299791 A | 10/1996 |
| WO | WO 95/00419 | 1/1995 |
| WO | WO 96/34778 | 11/1996 |
| WO | WO 98/07591 | 2/1998 |

* cited by examiner

Primary Examiner—Frank E. Werner
(74) Attorney, Agent, or Firm—Wood, Phillips, Katz, Clark & Mortimer

(57) ABSTRACT

In a motor vehicle including a load receiving bed, a chassis includes a generally horizontal base, from which there extends a pair of legs, and four hydraulic cylinders, associated lines, associated valves, and a flow restriction device are provided for moving the load receiving bed between a raised transport position and a lowered position against a surface upon which the vehicle is resting. A tail gate is pivotally attached to a rear portion of the load receiving bed.

5 Claims, 5 Drawing Sheets

RAISABLE/LOWERABLE VEHICLE BED CARRYING LOADS

TECHNICAL FIELD

The present invention relates to vehicles including motor vehicles and towed vehicles in which the vehicle is provided with a load receiving tray or bed which is movable from a raised transport position to a lowered position at which the bed is located adjacent ground level to facilitate loading and unloading.

BACKGROUND OF THE INVENTION

U.S. Pat. No. 5,035,462 describes a motor vehicle having a chassis provided with a cab, and a rear assembly including a vertically movable load receiving bed, which is movable between an upper transport position and lower position located substantially at ground level. Inventive improvements on this vehicle are descrbked in International Publication No. WO 96/34778 (from International Application No. PCT/AU96/00255) and in International Publication No. WO 98/07591 (from International Application No. PCT/AU97/00523). In these vehicles, mechanical linkage systems are employed to raise and lower the load receiving bed.

SUMMARY OF THE INVENTION

As provided by this invention, a vehicle assembly includes a chassis of generally "U" shaped configuration so as to provide a generally horizontal transverse base from which there rearwardly extends a pair of legs, and load receiving bed supported between the legs and movable between a raised transport position and a lowered position against a surface upon which the vehicle is resting.

Moreover, the vehicle assembly includes a pair of forward hydraulic cylinders spaced on opposite sides of the load receiving bed and operatively extending between the chassis and the load receiving bed and a pair of rearward hydraulic cylinders located on opposite sides of the load receiving bed and operatively extending between rear portions of the legs and the load receiving bed, wherein the four cylinders support the bed in the raised and lowered positions and are arranged in series one to four. Each cylinder has a rod providing a swept volume. The swept volumes are arranged so that the rods move in unison. Each cylinder has a rod end and a non-rod end. The cylinders are connected so that fluid flows between a rod end and a non-rod end of adjacently connected cylinders.

Furthermore, the vehicle assembly includes hydraulic means to deliver hydraulic fluid under pressure to the hydraulic cylinders to raise and lower the load receiving bed, which means include a pump to provide hydraulic fluid under pressure, a control valve, a flow restriction device, a first hydraulic line extending to the first cylinder, a second hydraulic line extending from the fourth cylinder, and a third hydraulic line extending from the valve to take hydraulic fluid from the valve. The control valve is connected to the pump to coordinate movement of hydraulic fluid to and from the cylinders. In a first operative position, the control valve connects the first hydraulic line to the pump and connects the second hydraulic line to the pump, thereby to raise the bed. In a second operative position, the control valve connects the second hydraulic line to the pump and connects the first hydraulic line to the third hydraulic line, thereby to lower the bed. The flow restriction device is operable to govern the speed at which the bed is lowered.

Preferably, the flow restriction device is located in the second hydraulic line. Preferably, the vehicle assembly further includes a one way valve arranged in parallel with respect to the flow restriction device, the one way valve providing for the flow of hydraulic fluid from the control valve to the first cylinder.

In a preferred embodiment of this invention, the vehicle assembly further includes forward catch means to engage the load receiving bed in the transport position but releasable to permit movement of the load receiving bed and the vehicle assembly further includes a tailgate pivotally attached to a rear portion of the load receiving bed and moveable with the load receiving bed between the raised and lowered positions thereof, wherein the tailgate is pivotally movable between a generally upright position extending between the legs and a lowered position extending rearwardly from the receiving bed, when lowered, to provide for access to the receiving bed, when lowered, and wherein the tailgate engages the legs to aid in vertically supporting the load receiving bed, when raised.

DESCRIPTION OF THE DRAWINGS

A preferred form of the present invention will now be described by way of example with reference to the accompanying drawings wherein.

DETAILED DESCRIPTION OF THE PREFERRED EMBODIMENT

Figure 1:
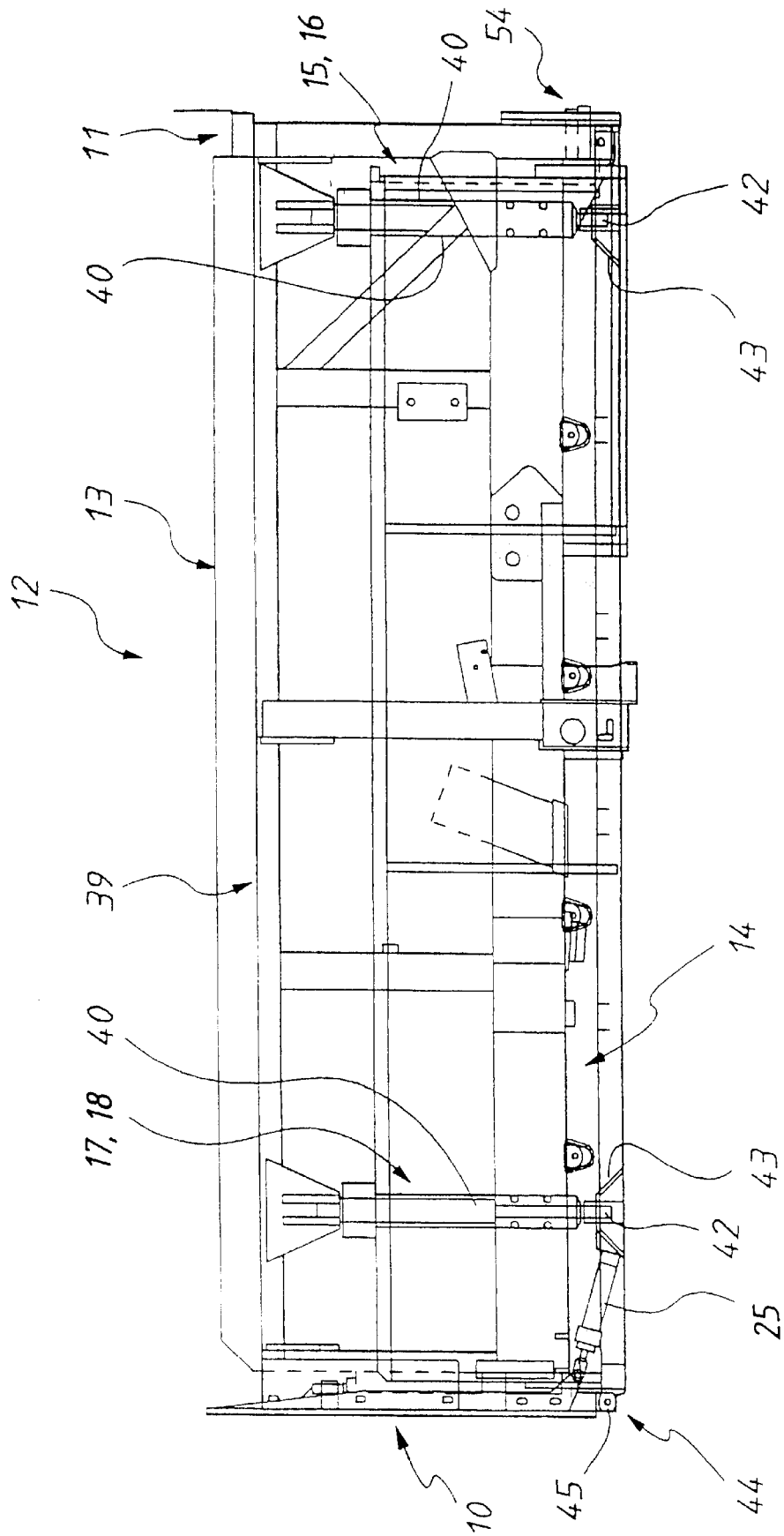
FIG. 1 is a schematic side elevation of the chassis of a vehicle.
Figure 2:
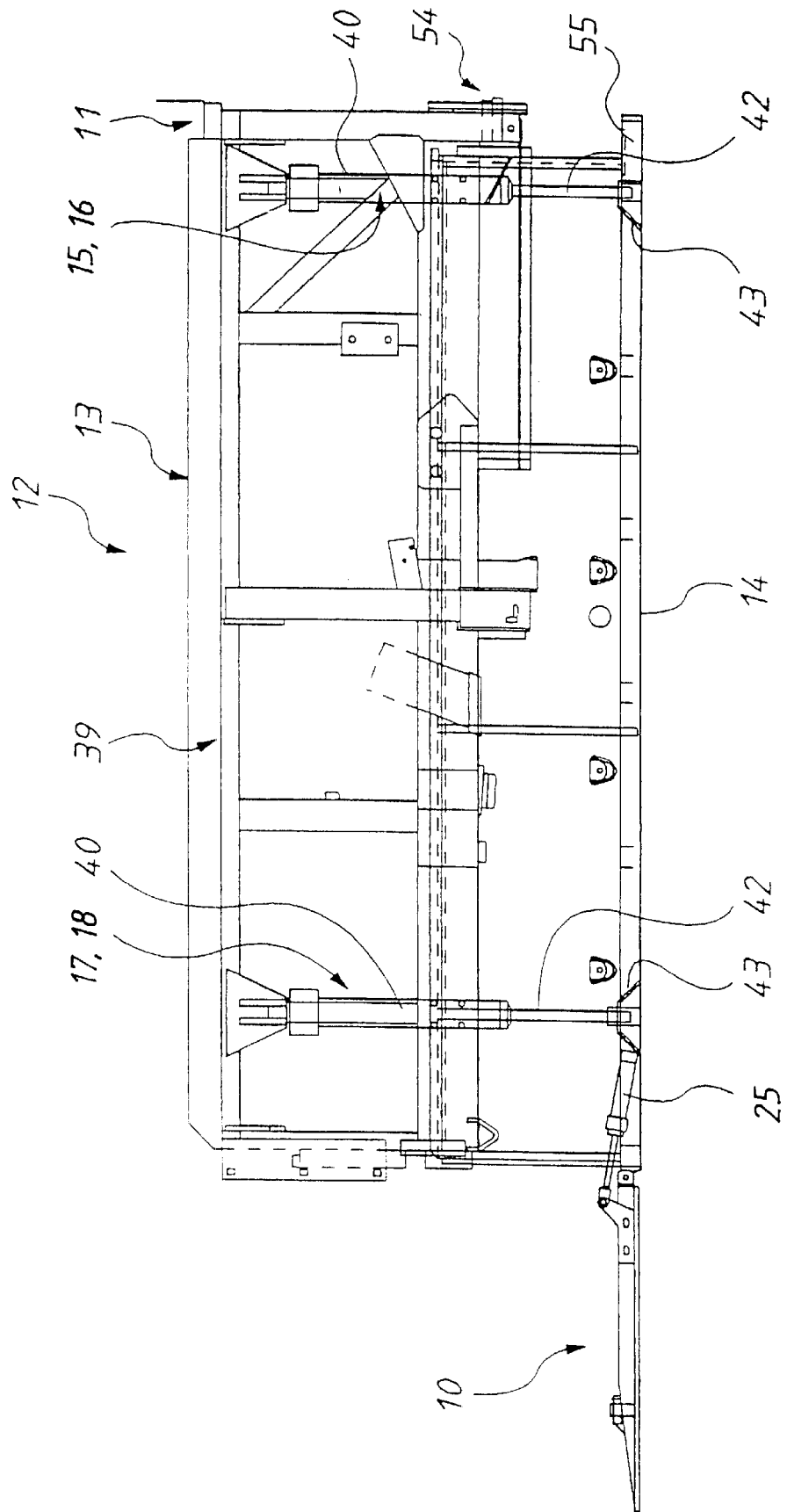
FIG. 2 is a further schematic side elevation of the chassis of FIG. 1.
Figure 3:
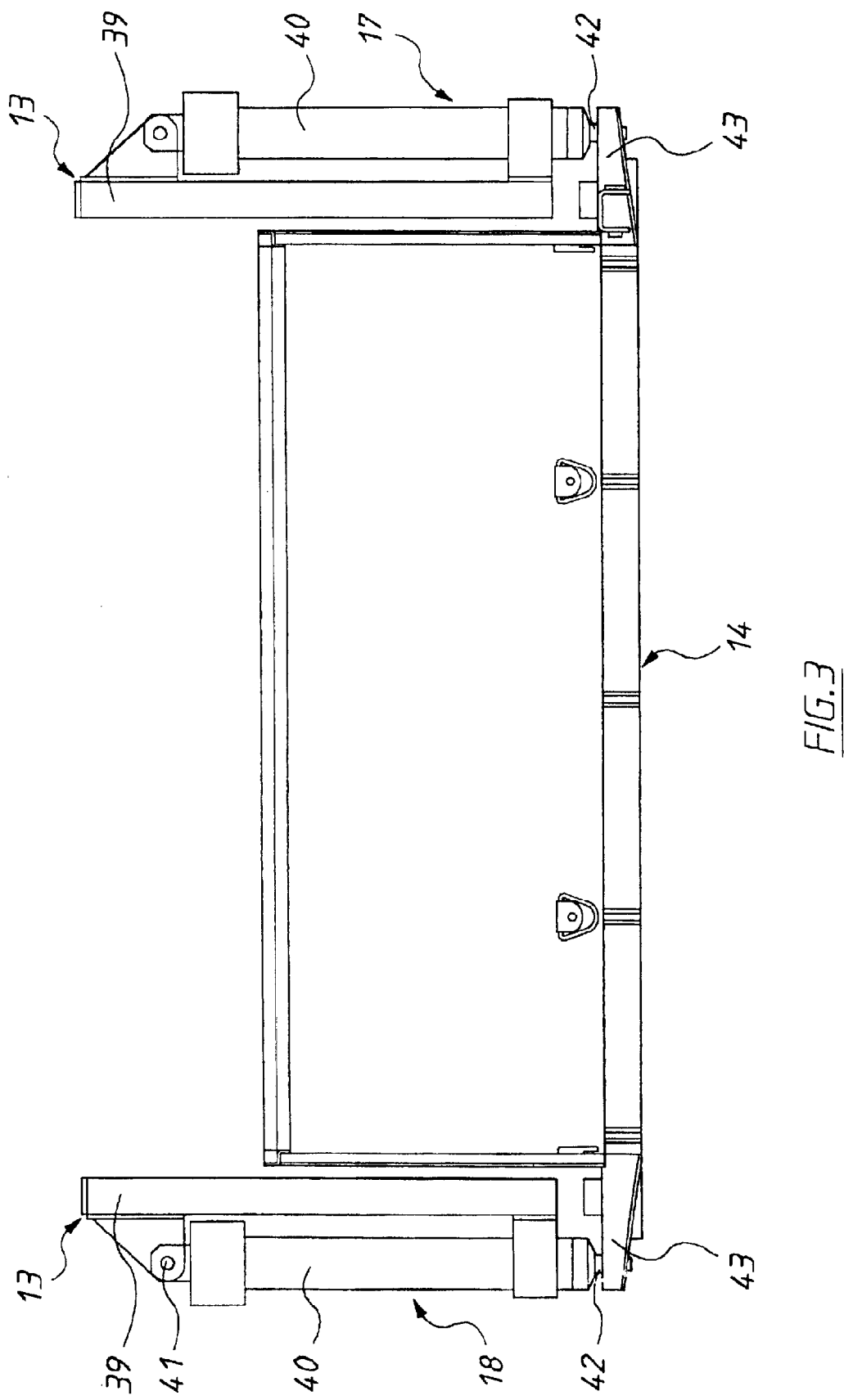
FIG. 3 is a schematic end elevation of the chassis of FIG. 1.
Figure 4:
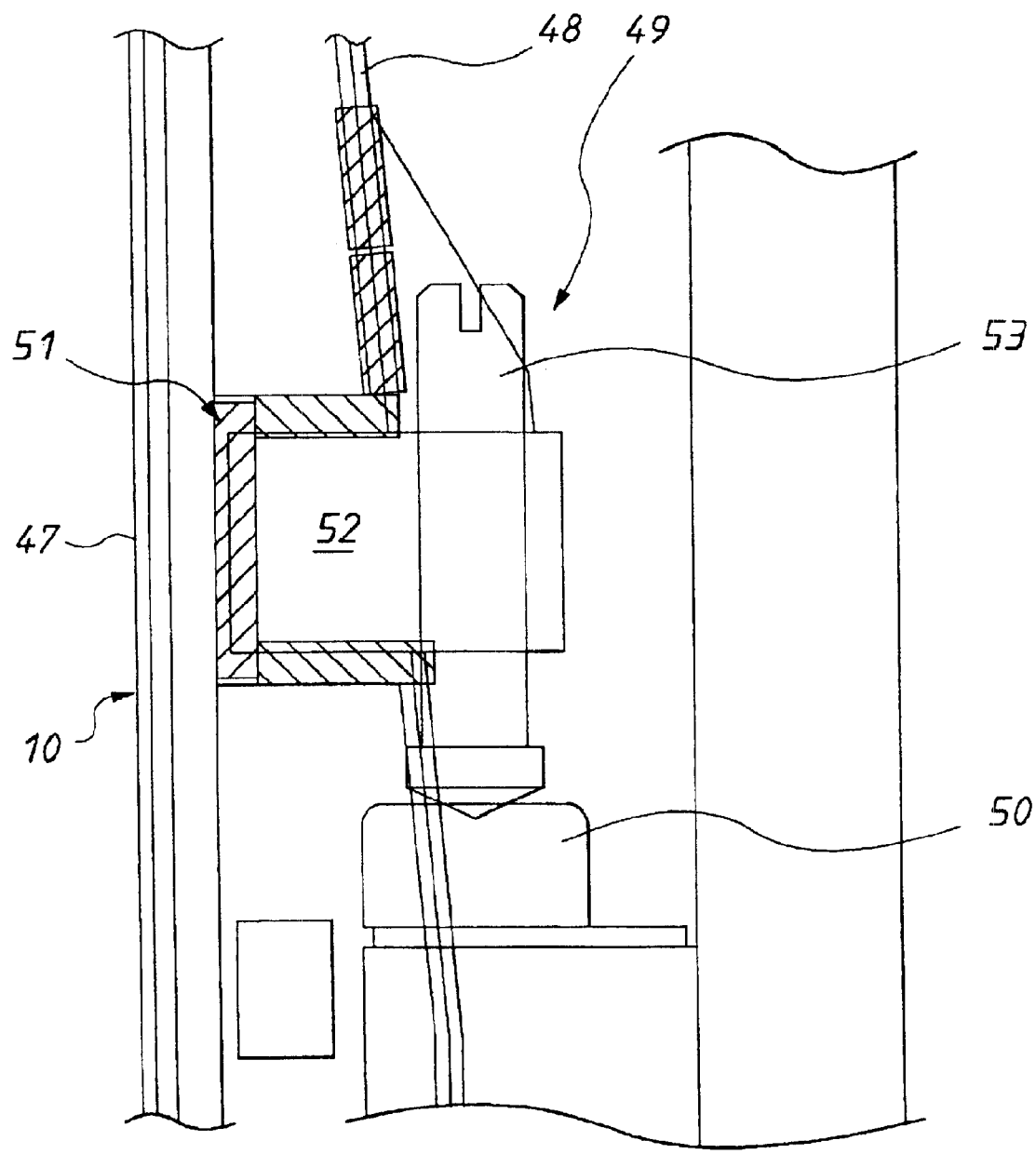
FIG. 4 is a schematic enlarged view of a portion of the chassis of FIG. 1.
Figure 5:
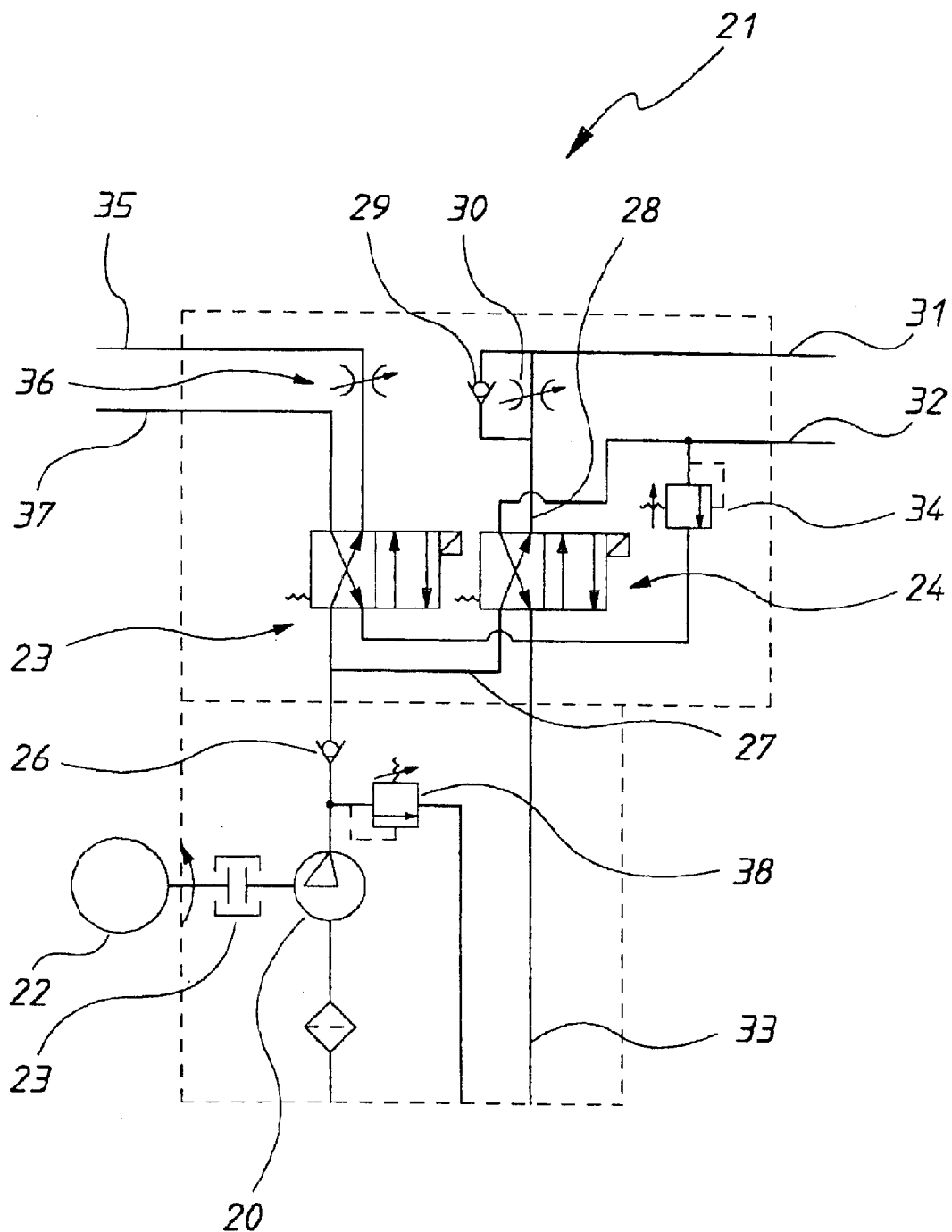
FIG. 5 is a schematic hydraulic circuit employed with the chassis of FIG. 1.

In the accompanying drawings there is schematically depicted the chassis 12 of the rear portion of a front wheel drive vehicle as illustrated in the above PCT application. The chassis 12 may be attached to a motorised cabin or towed. In this embodiment the chassis 12 is intended to be attached to a motorised cabin. The chassis 12 is of a "U" shaped configuration so as to provide a generally horizontal transverse base 11 from which there rearwardly extends a pair of generally parallel coextensive legs 13. Supported between the legs is a load receiving bed 14 which is movable between a raised transport position and a lowered position facilitating loading and unloading.

Supporting the bed 14 are four hydraulic cylinders 15 to 18, with the forward pair of cylinders 15 and 16 being located at forward portions of the chassis 12 but on opposite sides of the chassis, while the rear pair of cylinders 17 and 18 are secured to rear portions of the legs 13 and are also located on opposite sides of the bed 14.

A hydraulic pump 20 is used to deliver hydraulic fluid to the cylinders 15 to 18 to raise the bed 14, with coordination of the cylinders 15 to 18 being controlled by a valve assembly 21.

The valve assembly 21 connects the pump 20 to the hydraulic cylinders 15 to 18, with the pump 20 being driven by a 12 volt electric motor 22 coupled to the pump 20 by means of a viscous drive assembly or drive coupling 23.

The valve assembly 21 includes a pair of spool valves 23 and 24, with the valve 23 being arranged to operate a tailgate 10 pivotally attached to a rear portion 44 of the bed 14, while the valve 24 operates the cylinders 15 to 18.

The cylinders 15 to 18 are connected in series and are configured so that the bed 14 is maintained generally horizontal during raising and lowering. This is achieved by having the non-rod end of cylinder 15 connected to the rod end of the cylinder 16, the non-rod end of cylinder 16 is connected to the rod end of the cylinder 17, and the non-rod end of cylinder 17 is connected to the rod end of the cylinder 18. In this embodiment the cylinder 15 has an internal diameter of 1.75 inches, the cylinder 16 has an internal diameter of 2 inches, the cylinder 17 an internal diameter of 2.25 inches and the cylinder 18 a diameter of 2.50 inches. When the diameter of the piston rods is taken into account, the swept volume of the rod side of one piston is equal to the swept volume of the non-rod side of the piston of the next adjacent cylinder. This ensures uniform movement of the piston rods. However, in that regard it should be appreciated that the cylinders 15 to 18 can be arranged in any serial order providing the swept volumes are arranged to match.

In a further embodiment, the cylinder 15 has an internal diameter of 2 inches, the cylinder 16 has an internal diameter of 2.25 inches, the cylinder 17 has an internal diameter of 2.5 inches and the cylinder 18 has an internal diameter of 2.75 inches.

The valve 24 receives hydraulic fluid under pressure from the pump 20 via a one-way valve 26. The valve 26 delivers the hydraulic fluid to hydraulic line 27. When the load receiving bed 14 is in its lowered position the valve 24 is in the position depicted. Hydraulic fluid under pressure is therefore delivered to the hydraulic line 28 which via a one-way valve 29 and flow restriction device 30 is connected to a hydraulic line 31. Hydraulic fluid under pressure delivered to the line 28 flows to the line 31 via the valve 29 rather than the flow restriction device 30. The line 31 is connected to the rod side of the cylinder 15. This will result in the bed 14 rising. Hydraulic fluid under pressure would then flow from the non-rod side of the cylinder 15 to the rod side of the cylinder 16. In turn hydraulic fluid under pressure would flow from the non-rod side of the cylinder 16 to the rod side of the cylinder 17. Again hydraulic fluid from the non-rod side of the cylinder 17 would flow to the rod side of the cylinder 18. Hydraulic fluid from the non-rod side of the cylinder 18 would be delivered to the hydraulic line 32. The line 32 extends to the valve 24 and would enable delivery of the hydraulic fluid (via line 33) to a tank. The line 33 is also provided with a relief valve 34 connected to the line 33. Simultaneously the hydraulic fluid is delivered under pressure to the valve 23 wherefrom it flows to hydraulic line 35. The hydraulic line 35 includes a flow restriction device 36 to control the speed at which the tailgate assembly opens and closes. A return hydraulic line 37 extends from the tailgate cylinder 46 to the valve 23 wherefrom the hydraulic fluid flows to the line 33 and then to a tank.

A relief valve 38 is provided and connects the high pressure side of the pump to tank.

When the bed 14 is to be lowered, the valves 23 and 24 are activated so that the pump 20 is directly connected to the lines 37 and 32. The tailgate cylinder 25 pivots the tailgate 10 to its lowered position extending generally rearwardly from the bed 14. To release the tailgate 10, hydraulic fluid under pressure is delivered to the line 32 and therefor the rod end of the cylinder 15. The hydraulic connections between the cylinders 15 to 18 will then ensure horizontal rising of the bed 14. Simultaneously, the solenoid or linear actuator operating the front catch 54 is activated allowing the front catch 54 to disengage and the tailgate 10 due to the weight of the bed 14 being lifted off the catch 54 at the front and the support members 50 employed to keep the tailgate 10 closed. As the front catch 54 becomes fully disengaged a microswitch mounted adjacent to the front catch 54 is triggered activating valve 23 reversing the oil flow thus causing the tail gate to commence opening. A microswitch mounted adjacent the tail gate 14 is then triggered, activating valve 24, reversing oil flow to cause the load receiving bed 14 to dissend at the same time as the tail gate is opening. Thus, the pump 20 is connected to line 32.

As the bed 14 is being lowered, the hydraulic fluid returns via the line 31. This hydraulic fluid must pass through the flow restrictor 30 which therefore governs the speed at which the bed is lowered and controls overrun of the cylinders 15 to 18 in downward motion caused by more oil flowing out of the cylinders 15 to 18 than is being forced in.

The pressure relief valve 34 is set at approximately 200 to 500 (preferably 200) PSI to limit the amount of downward force exerted on the bed 14 should it foul on an obstacle, while the relief valve 38 is set at approximately 2500 PSI to protect the hydraulic circuit and limit the amount of load that can be lifted.

Each leg 13 includes a sub-frame 39 to which the cylindrical body 40 of each of the cylinders 15 to 18 is pivotally attached by means of a pivot pin 41. The piston rod 42 of each cylinder 15 to 18 is attached to the load receiving bed 14. The load receiving bed 14 has four transversely extending projections 43 to which the piston rods 42 are attached.

The tailgate 10 in combination with the catch assembly 43 aids in retaining the bed 14 secured to the chassis 12.

The tailgate 10 is pivotally attached to a rear portion 44 of the bed 14 by means of a pivot assembly 45. The tailgate 10 has a rearward facing surface 47 and an inner surface 48 which faces the interior of the chassis 12. Each transverse edge portion of the tailgate 10 is provided with a support assembly 49 which engages a support member 50 fixed to each of the arms 13. The support assembly 49 includes a socket 51 mounted internally of the tailgate 10 from which there projects a support block 52. The support block 52 threadably engages a support shaft 53 which is adjustable and engages the support member 50. When the tailgate 10 is in the raised position the support shaft 52 is engaged with the block 51.

When the bed 14 is raised, the support shaft 53 is spaced vertically above the support member 50. However hydraulic fluid "leaking" back to tank enables the bed 14 to lower until the shaft 53 engages the support member 50. The tailgate 10 therefore aids in supporting the bed 14 at the rear of the bed 14.

The catch assembly 54 engages a pin 55 projecting forwardly from the bed 14. The catch 54 includes a pivoted catch member having a hook which passes about the pin 55. This arrangement is described in detail both in construction and operation in the above mentioned International Publications No. WO 96/34778 and No. WO 98/07591, the disclosures of which are incorporated herein by reference.

What is claimed is:

1. An assembly for a vehicle, said assembly including a chassis of generally "U" shaped configuration so as to provide a generally horizontal transverse base provided with a pair of rearwardly extending pair of legs, and load receiving bed supported between the legs and moveable between a raised transport position and a lowered position against a surface upon which the vehicle is resting;

wherein the assembly further includes a pair of forward hydraulic cylinders spaced on opposite sides of the load receiving bed and operatively extending between the chassis and the load receiving bed and a pair of rearward hydraulic cylinders located on opposite sides of the load receiving bed and operatively extending between rear portions of the legs and the load receiving bed, wherein the four cylinders support the bed in the raised and lowered positions and are arranged so as to be hydraulically connected in series so as to provide a first cylinder, a second cylinder, a third cylinder and a fourth cylinder, wherein each cylinder has a rod providing a swept volume and the swept volumes are arranged so that the rods move in unison, and wherein each cylinder has a rod end and a non-rod end and the cylinders are connected so that fluid flows between a rod end and a non-rod end of adjacently connected cylinders; and wherein the assembly further includes hydraulic means to deliver hydraulic fluid under pressure to the hydraulic cylinders to raise and lower the load receiving bed, which means include a pump to provide hydraulic fluid under pressure, a control valve, a flow restriction device, a first hydraulic line extending to the first cylinder, a second hydraulic line extending from the fourth cylinder, and a third hydraulic line extending from the valve to take hydraulic fluid from the valve, wherein the control valve is connected to the pump to coordinate movement of hydraulic fluid to and from the cylinders, wherein, in a first operative position, the control valve connects the first hydraulic line to the pump and connects the second hydraulic line to the pump, thereby to raise the bed, wherein, in a second operative position, the control valve connects the second hydraulic line to the pump and connects the first hydraulic line to the third hydraulic line, thereby to lower the bed, and wherein the flow restriction device is operable to govern the speed at which the bed is lowered.

2. The assembly of claim 1, wherein the flow restriction device is located in the second hydraulic line.

3. The assembly of claim 2 wherein the vehicle assembly further includes a one way valve arranged in parallel with respect to the flow restriction device, the one way valve providing for the flow of hydraulic fluid from the control valve to the first cylinder.

4. The assembly of claim 1 wherein the vehicle assembly further includes a one way valve arranged in parallel with respect to the flow restriction device, the one way valve providing for the flow of hydraulic fluid from the control valve to the first cylinder.

5. The assembly of any one of claims 1, 2, 4, or 3 wherein the assembly further includes forward catch means to engage the load receiving bed in the transport position but releasable to permit movement of the load receiving bed, wherein the assembly further includes a tailgate pivotally attached to a rear portion of the load receiving bed so as to be thus moveable with the load receiving bed between the raised and lowered positions thereof, wherein the tailgate is pivotally moveable between a generally upright position extending between the legs and a lowered position extending rearwardly from the receiving bed, to provide for access to the receiving bed, and wherein the tailgate engages the legs to aid in vertically supporting the load receiving bed, when raised.

* * * * *